(12) United States Patent
Gaconnier

(10) Patent No.: US 11,442,533 B2
(45) Date of Patent: Sep. 13, 2022

(54) SYSTEM FOR MIXED REALITY EXPERIENCES

(71) Applicant: iPMachine, LLC, Dallas, TX (US)

(72) Inventor: Stephen P. Gaconnier, Dallas, TX (US)

(73) Assignee: iPMachine, LLC, Dallas, TX (US)

(*) Notice: Subject to any disclaimer, the term of this patent is extended or adjusted under 35 U.S.C. 154(b) by 0 days.

(21) Appl. No.: 17/020,429

(22) Filed: Sep. 14, 2020

(65) Prior Publication Data

US 2021/0081033 A1    Mar. 18, 2021

Related U.S. Application Data

(60) Provisional application No. 62/900,133, filed on Sep. 13, 2019.

(51) Int. Cl.
*G06F 3/01* (2006.01)
*G06T 19/00* (2011.01)

(52) U.S. Cl.
CPC ............ *G06F 3/011* (2013.01); *G06T 19/006* (2013.01); *G06T 2200/24* (2013.01)

(58) Field of Classification Search
None
See application file for complete search history.

(56) References Cited

U.S. PATENT DOCUMENTS

| 6,064,355 A   | * | 5/2000 | Donahue .............. A63F 13/00 345/8 |
| 2017/0072316 A1 | * | 3/2017 | Finfter ................ A63F 13/26 |
| 2017/0103571 A1 | * | 4/2017 | Beaurepaire ....... G01C 21/3667 |
| 2018/0253905 A1 | * | 9/2018 | McCracken ......... G02B 27/017 |

OTHER PUBLICATIONS

Youtube Video "VR Hot Air Balloon Ride", downloaded @ https://www.youtube.com/watch?v=nNCr9kq0Ro4, posted on Jun. 6, 2018 (Year: 2018).*
Vimeo Video; "Virtual Reality Hot Air Balloon Experience"; https://vimeo.com/238322354; posted Oct. 15, 2017 (Year: 2017).

* cited by examiner

*Primary Examiner* — Yingchun He

(57) ABSTRACT

The disclosure provides a system that provides a mixed reality experience for users. Mixed reality is the blending of real and virtual (or digital) worlds to produce environments and visualizations where both physical and digital objects co-exist and can also interact in real time. The disclosure provide a MR system for the interaction of users, computers, and an environment in which users can experience using all five senses. In one example, the disclosure provides a mixed reality system that includes: (1) a structure, (2) a vehicle configured to support at least one user, wherein the vehicle is suspended from the structure via an articulating universal connection mount, and (3) a system controller configured to provide virtual reality video content to a virtual reality interface in response to interactions of the user with the vehicle and the virtual reality interface, wherein the virtual reality video content corresponds to the real world of the vehicle.

20 Claims, 2 Drawing Sheets

SYSTEM FOR MIXED REALITY EXPERIENCES

CROSS-REFERENCE TO RELATED APPLICATION

This application claims the benefit of U.S. Provisional Application Ser. No. 62/900,133, filed by Stephen P. Gaconnier on Sep. 13, 2019, entitled "A SYSTEM FOR MIXED REALITY EXPERIENCES," commonly assigned with this application and incorporated herein by reference in its entirety.

TECHNICAL FIELD

This disclosure relates to mixed reality experiences and, more specifically, to a system or structure that provides mixed reality experiences for a user.

BACKGROUND

The gaming industry continues to expand into different areas of reality, such as virtual reality (VR), as new devices are developed. VR worlds are created by software and presented to a user via a computing device, such as VR head-mounted displays (VR HMDs). A VR HMD allows a user to experience an artificial environment that is presented to the user such that the user can accept it as a real environment. Typically, however, a user only experiences the VR through two of the five senses: sight and sound.

SUMMARY

In one aspect, the disclosure provides a mixed reality system. In one example, the disclosure provides a mixed reality system that includes: (1) a structure, (2) a vehicle configured to support at least one user, wherein the vehicle is suspended from the structure via an articulating universal connection mount, and (3) a system controller configured to provide virtual reality video content to a virtual reality interface in response to interactions of the user with the vehicle and the virtual reality interface, wherein the virtual reality video content corresponds to the real world of the vehicle.

BRIEF DESCRIPTION

Figure 1:
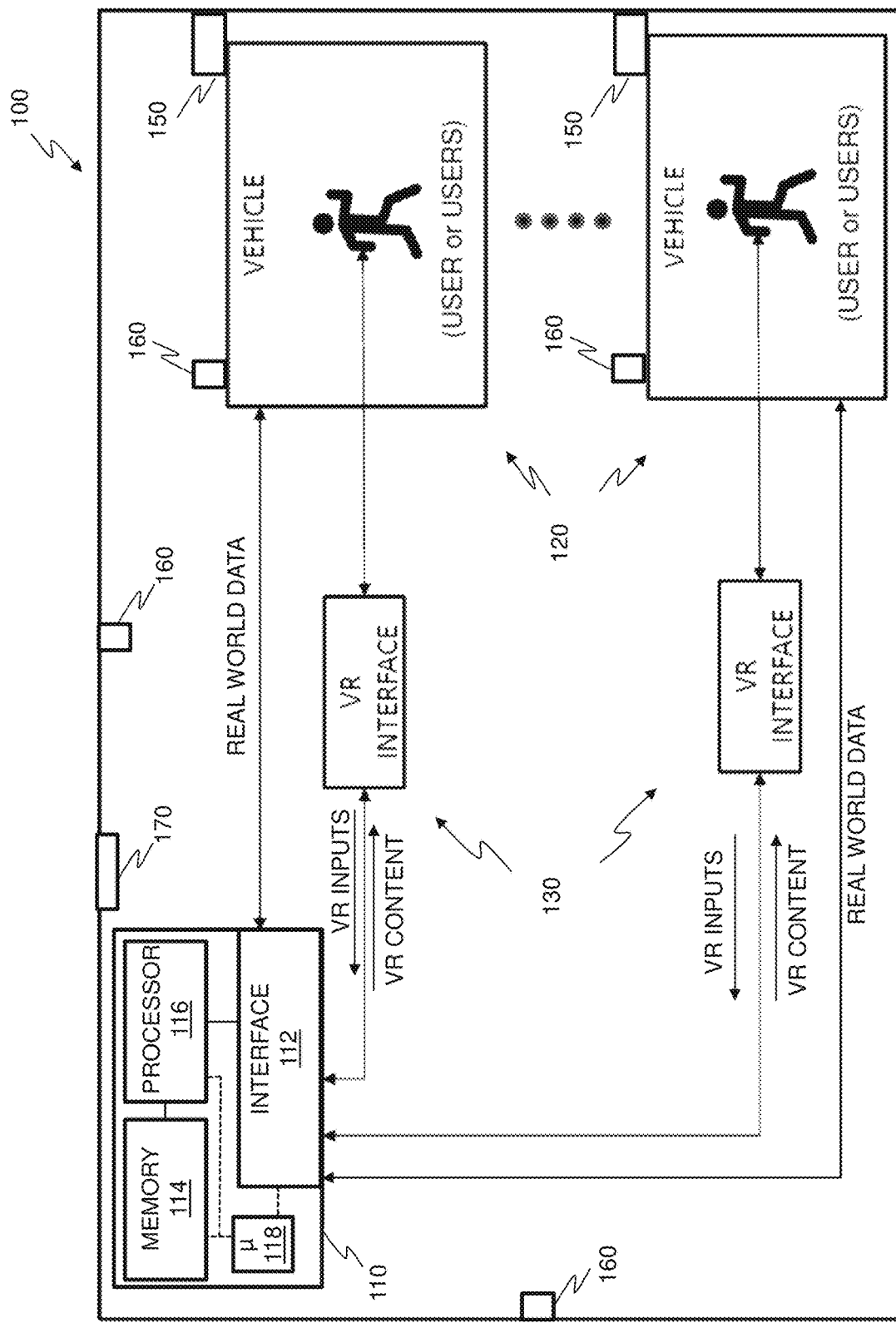
Figure 2:
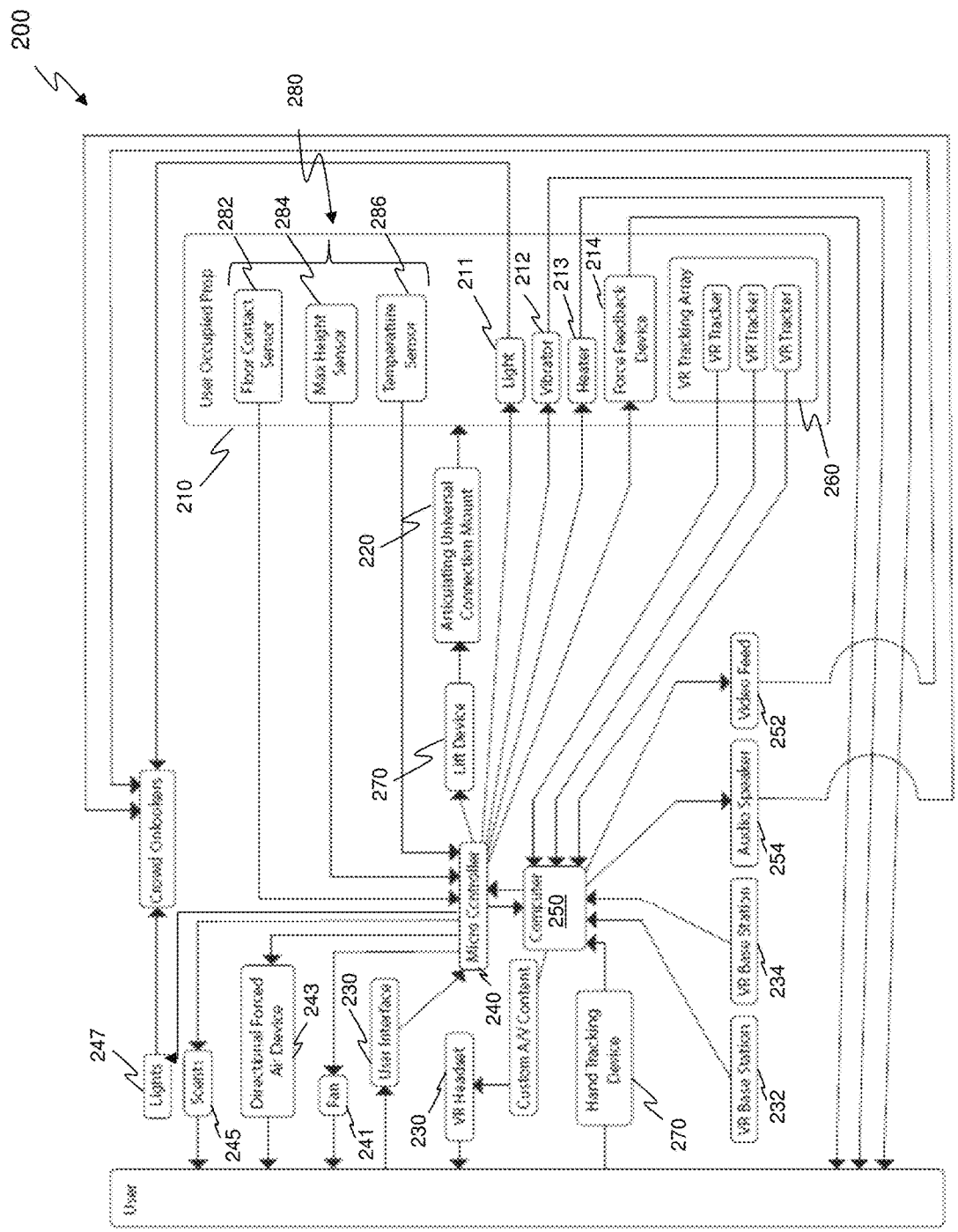

Reference is now made to the following descriptions taken in conjunction with the accompanying drawings, in which:

FIG. 1 illustrates a block diagram of an example of a MR system constructed according to the principles of the disclosure; and FIG. 2 illustrates 2 a system diagram of an example of a MR system in an environment that includes a user and onlookers.

DETAILED DESCRIPTION

The disclosure provides a system that provides a mixed reality experience for users. Mixed reality (MR) is the blending of real and virtual (or digital) worlds to produce environments and visualizations where both physical and digital objects co-exist and can also interact in real time. MR provides a platform for the interaction of users, computers, and an environment in which users can experience using all five senses.

FIG. 1 illustrates a block diagram of an example of a MR system 100 constructed according to the principles of the disclosure. The MR system 100 includes a system controller 110, multiple vehicles collectively referred to as vehicles 120, VR interfaces for each of the vehicles 120 collectively referred to as VR interfaces 130, and a support structure 140. In FIG. 1, the system controller 110, vehicles 120, and VR interfaces 130 are located within a volume defined by the support structure 140. In other examples, the system controller 110 and one or more of the VR interfaces 130, or portions thereof, can be located external to the volume defined by the support structure 140. One of more of the vehicles 120 can be located wholly within an area or volume defined by the support structure 140.

The support structure 140 is configured, i.e., designed and constructed, to support, such as by suspending, the vehicles 120 and user or users within the vehicles 120. The support structure 140 can be configured for semi-permanent, permanent, and/or temporary installations. Accordingly, the support structure 140 can be configured with components, such as connectors, joints, cabling, etc., that allows for both ease of installation and lasting installations. For example, quick-disconnect connections can be used for the electrical connections between the various components supported by the support structure 140. The support structure 140 can be constructed of metal or other material sufficiently sturdy to support the one or more vehicles 120.

The support structure 140 includes articulating universal connection mounts 150 that are each configured to attach one of the vehicles 120 to the support structure 140. Each of the articulating universal connection mounts 150 is configured to support multiple types of vehicles and allows switching between the different types of vehicles without having to change the mount. The articulating universal connection mounts 150 also allow movement of the vehicles 120 with the user or users. A lifting device, such as a hydraulic lift, (not shown) can be coupled to each of the articulating universal connection mounts 150 to move the vehicles 120, such as raise and lower the vehicles 120, under the direction of the system controller 110. The articulating universal connection mounts 150 advantageously translate the movement from the lifting device or another type of movement device to whichever one of the vehicles 120 it is supporting. In addition to the above, the support structure 140 can also support speakers and a video screen to allow onlookers to experience the VR world of the user or users within the vehicles 120. The support structure 140 can also support a camera or a system of cameras to capture the user's MR experience. The captured images can be used for promotional purposes. In some examples, the system controller 110 can be configured to post the captured images on various types of social media.

The system controller 110 can be configured to interface with the different types of social media platforms and distribute the captured images. This can be done automatically and based on input from the user, such as their ID in the various social media platforms. The system controller 110 can also use the ID information to contact a user when it is time for their MR experience. For example, the user can be texted that their time is ready. The captured images can also be shown on a screen, such as attached to the support structure 140. In some example, the captured images can be sent to a third party for use and/or distribution. The camera system can include a video camera wherein the captured images are captured video that can include audio.

Each of the vehicles 120 can have one or more users and each user has or employs a VR interface 130. Typically, each user has her/his own VR interface. The VR interfaces 130 can be conventional VR interfaces that are used in the industry. For example, the VR interfaces 130 can be a VR HMD that is worn by a user. In some examples, the VR interfaces 130 can be a 3D interface. The VR interfaces 130 provides a virtual world, generated by the system controller 110, for a user that corresponds to the particular one of the vehicles 120 in which they are located and the environment associated with that vehicle. The generated virtual world also responds to the movements and interaction of a user, or multiple users, within at least one of the vehicles 120.

The system controller 110 provides the VR content to the users via the VR interfaces 130 in response to movement or direction sensed by the VR interfaces 130 and user interaction with the vehicles 120. As an example, one or more of the vehicles 120 can be a basket for a hot air balloon and the VR environment can include details of the basket that correspond to the real world basket and a VR balloon ride in the basket. The VR interfaces 130 can provide a surround view of the VR environment that includes the details of the balloon and what is viewable outside of the balloon in the VR environment. The VR environment viewable by the user typically corresponds to the direction in which the user turns their head, i.e., where the user is looking in the VR world; such as with a VR HMD. The user can reach for the edge of the VR basket and actually grab the edge of the real basket (i.e., the vehicle) in which they are standing. The user can then bend-over the real world basket edge and look at the VR view below. In the MR system 100, multiple vehicles 120 are shown. The vehicles 120 can be different types of vehicles that correspond to different VR worlds. For example, in addition to a balloon basket, a shark cage or another type of vehicle can be used. Instead of multiple vehicles, the MR system 100 may include a single vehicle.

The system controller 110 is configured to direct the operation of the MR system 100 to provide a mixed reality experience for at least one user within at least one of the vehicles 120. The system controller 110 is a computing device or devices that are configured to perform the operations disclosed herein. The system controller 110 at least includes an interface 112 for transmitting and receiving data and commands (or signals), a data storage and/or memory 114, and a processor 116 (or processors). While a single system controller 110 is illustrated, in other examples multiple system controllers can be employed. In some example, a single system controller can be used with each one of the vehicle 120.

The interface 112 is configured, i.e., designed and constructed, to communicate data. As such, the interface 112 includes the necessary circuitry, software, and/or combination thereof to transmit and receive data. The interface 112 can be a conventional interface that communicates according to standard protocols. In addition, or alternatively, the interface 112 can also communicate via proprietary protocols.

The memory 114 is configured to store data. The memory 114 can include different types of memories that store data. The memory 114 at least includes a non-transitory computer readable medium that is configured to store a series of operating instructions that direct the operation of the processor 116 when initiated to control the mixed reality experience. The operating instructions can correspond to algorithms that direct one or more mixed reality experience.

The system controller 110 can include proprietary hardware and/or software that is separated from another portion of the system controller 110 and is protected, e.g., sealed, locked, encrypted, etc., from detection. The memory 114 can have a separate section that is designated for the proprietary software. The system controller 110 can also include a microcontroller 118. In such an example, the microcontroller 118 can include the proprietary information and can be coupled to the processor 116 or another computing device. The components of the system controller 110 can be communicatively coupled together via conventional connections. The possible connections to the microcontroller 118 are represented by dashed lines.

As noted above, the system controller 110 provides VR video content to the VR interfaces 130 for a user (or users) that corresponds to real world (RW) interactions of the user with at least one of the vehicles 120 and VR inputs. In some examples, one user's actions can influence the VR video content generated for another user that is located in the same vehicle or in another one of the vehicles 120. Continuing the basket example, when one user leans over the edge of the basket, the VR content view can be tilted for another user to represent a weight shift in the basket. Additionally, the system controller 110 can generate VR video content and real world effects for the user or users in one of the vehicles 120 that are influenced by the user or users in another one of the vehicles 120. For example, a user can cause their VR balloon to collide with another balloon in the VR world. The VR inputs can be, for example, which direction a user is looking.

In addition to receiving VR inputs from the VR interfaces 130, the system controller 110 also receives the RW inputs from the vehicles 120 as a result of user interaction. The interaction inputs can be via a real world user interface on the vehicle. For example, a burner valve on the real world basket can be operated by a user to virtually lift the balloon in response to the user operating the burner valve. While there is an actual burner valve in the real world, there is also a corresponding one in the VR world such that when the user reaches in the VR world for the burner valve, the user can grab the actual burner valve. The VR content that is generated corresponds to how much "burn" is used on the real world burner valve, i.e., a fast or slow ascent.

Inputs can also be provided to the system controller 110 through sensors 160 attached to the vehicles 120 or support structure 140. The sensors 160 can be used to detect and then indicate user interaction with the vehicles 120 to the system controller 110 that then can use the sensor inputs when generating the VR video content for the VR interfaces 130. For example, the system controller could "shake" VR video content in response to a vibration sensor on the vehicle. The type of sensors that can be used includes but is not limited to acoustic, vibrations, position, angle, displacement, optical, pressure, temperature, and acceleration. Safety sensors can also be used to protect the system 100. A kill switch 170 can be located proximate, or mounted on the structure 140, for added protection of users and the system 100.

The system controller 110 can also control devices to effect the real world environment of the user. The effects can be in response to interactions of the user with the real world. For example, the system controller 110 can turn on heaters to correspond to operating the burner valve. The effects can also be due to interactions between the real world and the VR world. For example, the user may not operate the burner valve sufficiently to lift the VR basket above a rock causing a collision in the VR world that can be felt in the real world by operating a piston to jar the basket. Other devices can also be operated to effect the environment of the user. The devices can be different depending on the VR environment that corresponds to the vehicle.

FIG. 2 illustrates a system diagram of an example of a MR system 200 in an environment that includes a user and onlookers. The system diagram illustrates the interaction between components of the MR system 200. The MR system 200 includes a single vehicle 210 (or user occupied prop) that is coupled to a support structure (not shown) via an articulating universal connection mount 220. A similar system can be used with multiple vehicles, such as illustrated in FIG. 1. Some of the features shown in FIG. 2 are discussed below.

For the MR system 200, a user steps into the vehicle 210 and is given a VR interface, which is a VR HMD 230 in FIG. 2. The vehicle 210 could be a basket as discussed above but other vehicles can also be used including, but not limited to, a shark cage, a ship, a roller coaster car, or a seat on a plane. The VR HMD 230 can be VR headset such as from Vive or another company. In some examples, a VR HMD mount could be used with a smartphone or other computing device.

Once the user is in the vehicle 210, there are a number of different ways for the user to interact. Light, heat, vibration, scents, touch, air, sounds, are some examples of sensory interactions available. For example, a user can touch a real world device of the vehicle 210 and get feedback whether the device is a steering wheel or a burner valve. A microcontroller 240, for example, can cooperate with a computer 250 to provide sensory interactions to a user. Additionally, proximity in the vehicle itself is being tracked with a 3D VR tracking array 260 that corresponds to the VR HMD 230. Three trackers can be used in order to average the space and get a more unique and more accurate response for where a user is in the vehicle 210 itself. VR base stations 232 and 234 can also cooperate with the computer 250 and the VR HMD 230 to provide the VR content. The vehicle 210 is not only in the real world but is also duplicated or replicated in the VR or digital world in order for the user to experience a one to one experience. Accordingly, what a user sees in the VR world, is what the user can reach out and touch in the real world.

The user interactions and movements are fed in to the microcontroller 240 that communicates with the computer 250. In response, to the different types of data, different commands are generated to create effects for the user depending on how the user is interacting with the vehicle 210 and the VR HMD 230. For example, the microcontroller 240 can send commands to direct the operation of a fan 241, a forced air device 243, and a scent device 245 to provide sensory interactions to the user. A command can also be sent to lights 247 for onlookers to provide them with an experience, also. Different triggers can be created to operate sensor devices of the vehicle 210 such as a light 211, a vibrator 212, a heater 213, and a forced feedback device 214 that provides a feel-response. Triggers can also be generated to activate a switch to operate a piston or dump a bucket of water on the user. Essentially, there are certain points along the way of the MR experience that the user controls and there are some that MR system 200 controls for the microcontroller 240 and computer 250 to give the user something above and beyond just a visual and audible experience. The microcontroller 240 can provide the feedback to the user and the computer 250 can provide the VR video content that corresponds thereto. The content can be custom content provided to the VR HMD 230. The microcontroller 240 can be a proprietary device. The computer 250 can also provide a video feed to a screen 252 for onlookers to view and experience. The video feed can correspond to what the user is viewing. The computer 250 can also provide audio to a speaker 254 for the onlookers. The audio can correspond to the video feed.

The MR experience provided by the MR system 200 provides effects, feedback, to the user based on interactions with the vehicle 210 and the VR video content. For example, if the user is in a balloon basket and engage the burner control, then when they look up they will see flames going into the balloon. They'll feel radiant heat coming down toward them, and they'll also feel lift the sensation of leaving the ground and the following sensation of heights. The lift can be provided by a vertical lift device 270 through the articulating universal connection mount 220. In other words, the MR experience, unlike just a VR world, uses various elements to help trick the brain into believing that the VR world is more of a real world experience. Feedback to the user can include forced feedback from the force feedback device, such as feeling a controller and the force to operate it.

The MR system 200 can also include a hand tracking device 275 that provides inputs to the computer 250 and can be used for the VR video content. The hand tracking device 275 can be a conventional device that is employed as another tracking device of the user in the vehicle 210.

In addition to sensor that provide feedback for the MR experience as discussed above regarding MR system 100, safety sensors 280 can be employed also. For example, a floor contact sensor 282 can be used to indicate if the vehicle 210 has touched or landed on the real world floor. A max height sensor 284 can also be used to indicate if the vehicle 210 has been lifted too high. A temperature sensor 286 can be used to make sure that the heater 213 has not produce too much heat or that a fire has not started with the MR system 200. Responses to the safety sensors 280 can be based on comparison to a threshold, such as when the threshold is met or exceeded. The response can be automatic, such as operation of fire extinguishers, lowering of the vehicle 210, etc. The microcontroller 240 is can be configured, i.e., designed, constructed, or programmed, to determine if an action is needed and provide the response. Other safety features can include electrical disconnects such as breakers. These can be installed by the lift device 270 or actuators. An emergency or kill switch, such as kill switch 170 of FIG. 1, can also be installed on the support structure for an attendant to operate when detecting trouble or at the request of a user. In response to operation of one of the electrical disconnects, the microcontroller 240 can end the MR experience. This can include lowering the vehicle 210 to the floor such that the user can exit. The safety features can protect the user and also the MR system 200.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein. The processors or computers can generate control signals or commands according to the algorithms and inputs received from an MR system. The MR is sometimes referred to as hybrid or 1:1 reality. Other similar terms can be used.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A mixed reality system, comprising:
a structure;
a vehicle configured to support multiple users, wherein the vehicle is suspended from the structure via an articulating universal connection mount; and
a system controller comprising a processor configured to provide virtual reality video content to a virtual reality interface of each of the multiple users in response to one or more active interactions of each of the multiple users with their respective virtual reality interface, in response to one or more active interactions of at least one of the multiple users with at least one control of the vehicle, and in response to movement of at least one of the multiple users with respect to the vehicle, wherein the virtual reality video content corresponds to a real world of the vehicle and action of any one of the multiple users within the vehicle affects all of the virtual reality video content provided to each one of the multiple users.

2. The mixed reality system as recited in claim 1, further comprising safety sensors associated with the vehicle and configured to limit or end operation of the mixed reality system in response to exceeding a threshold, and a manually operated emergency kill switch mounted on the structure and configured to end the operation of the mixed reality system and automatically lower the vehicle to an original position, wherein the safety sensors include a floor contact sensor, a maximum height sensor, and a temperature sensor.

3. The mixed reality system as recited in claim 1, wherein the vehicle is a balloon basket.

4. The mixed reality system as recited in claim 1, wherein the virtual reality interface is a virtual reality head mounted display.

5. The mixed reality system as recited in claim 3, wherein the system controller further includes a separate microcontroller communicatively coupled to the processor, wherein the microcontroller includes proprietary software that generates commands for sensory feedback to the multiple users in response to the one or more active interactions with the at least one control of the vehicle and the movement of at least one of the users, and generates commands for the processor to provide the virtual reality video content for each one of the multiple users.

6. The mixed reality system as recited in claim 1, further comprising a movement device coupled to the articulating universal connection mount, wherein the articulating universal connection mount translates movement from the movement device to the vehicle in response to the one or more active interactions of the user with the at least one control of the vehicle.

7. The mixed reality system as recited in claim 1, wherein the vehicle is in the real world and replicated in a virtual world of the virtual reality video content.

8. The mixed reality system as recited in claim 1, further comprising one or more heaters that direct heat to the user in response to the one or more active interactions of the user with the at least one control of the vehicle.

9. The mixed reality system as recited in claim 1, further comprising a forced feedback device that provides sensory feedback to the user in response to the one or more active interactions.

10. The mixed reality system as recited in claim 1, wherein the vehicle is a first vehicle and the mixed reality system includes a second vehicle, wherein the system controller is configured to provide virtual reality video content to a user of the second vehicle that is influenced by the interaction or movement of one of the multiple users of the first vehicle.

11. The mixed reality system as recited in claim 1, wherein the vehicle is a first vehicle and the mixed reality system includes a second vehicle, wherein the system controller is configured to provide virtual reality video content to at least one of the multiple users of the first vehicle that is influenced by an interaction or movement of a user of the second vehicle.

12. The mixed reality system as recited in claim 1, wherein the vehicle does not constrain movement of the multiple users within the vehicle.

13. The mixed reality system as recited in claim 12, further comprising a three dimensional virtual reality tracking array that corresponds to the virtual reality interface and tracks the movement of the multiple users within the vehicle, and a hand tracking device that detects hand movement of at least one of the multiple users, wherein the system controller is further configured to provide the virtual reality video content in response to the hand movement.

14. A mixed reality system, comprising:
a stationary structure;
a vehicle configured to support multiple users, wherein the vehicle is suspended from the stationary structure via an articulating universal connection mount;
a vertical lifting device coupled to the articulating universal connection mount; and
a system controller comprising a processor configured to provide virtual reality video content to a virtual reality head mounted display of each of the multiple users in response to one or more active interactions of each of the multiple users with their respective virtual reality head mounted display, in response to active interactions of the multiple users with controls of the vehicle, and in response to movement of the multiple users with respect to the vehicle, wherein the articulating universal connection mount translates movement from the vertical lifting device to the vehicle in response to the active interactions of the multiple users with the controls of the vehicle, wherein the virtual reality video content corresponds to a real world of the vehicle and action of any one of the multiple users within the vehicle affects all of the virtual reality video content provided to another one of the multiple users.

15. The mixed reality system as recited in claim 14, wherein the vehicle is a shark cage.

16. The mixed reality system as recited in claim 14, further comprising a screen that displays the virtual reality video content external to the structure.

17. The mixed reality system as recited in claim 14, wherein the vehicle is a balloon basket and the at least one control is a burner valve.

18. The mixed reality system as recited in claim 17, further comprising one or more heaters that direct heat to the user in response to the one or more active interactions of the user with the at least one control of the vehicle.

19. The mixed reality system as recited in claim 17, further comprising a forced feedback device that provides sensory feedback to the user in response to the one or more active interactions.

20. A mixed reality system, comprising:
   a structure;
   a vehicle configured to support multiple users, wherein the vehicle is suspended from the structure via an articulating universal connection mount;
   a system controller configured to provide virtual reality video content to a virtual reality head mounted display of each of the multiple users in response to one or more active interactions of each of the multiple users with their respective virtual reality head mounted display, in response to one or more active interactions of at least one of the multiple users with at least one control of the vehicle, and in response to movement of at least one of the multiple users with respect to the vehicle,
   wherein the system controller includes a processor and a separate microcontroller communicatively coupled to the processor, wherein the microcontroller includes proprietary software that generates commands for sensory feedback to the multiple users in response to the one or more active interactions with the at least one control of the vehicle and movement of at least one of the multiple users, and generates commands for the processor to generate the virtual reality video content for each one of the multiple users,
   wherein the vehicle is in a real world and is replicated in a virtual world of the virtual reality video content, which corresponds to the real world of the vehicle and the one or more active interactions with the at least one control of the vehicle and action of any one of the multiple users within the vehicle affects all of the virtual reality video content provided to each one of the multiple users.

\* \* \* \* \*